Figure 1:
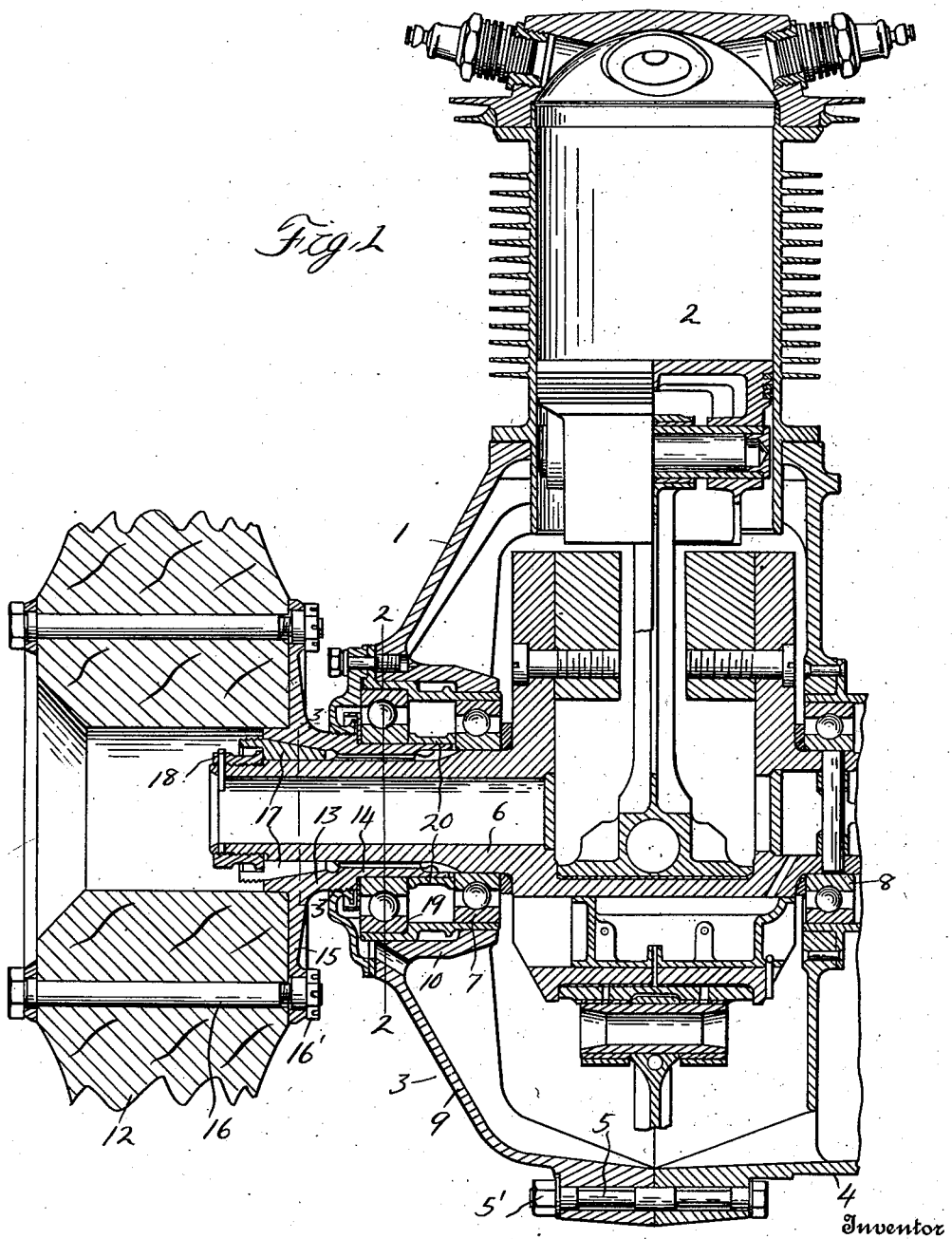

June 4, 1929.  W. O. WARNER  1,716,095
INTERNAL COMBUSTION ENGINE FOR AIRCRAFT
Filed Nov. 14, 1927   2 Sheets-Sheet 2

Inventor
William O. Warner
By Whittemore Hulbert Whittemore Belknap
Attorneys

Patented June 4, 1929.

1,716,095

UNITED STATES PATENT OFFICE.

WILLIAM O. WARNER, OF DETROIT, MICHIGAN, ASSIGNOR TO THE WARNER AIRCRAFT CORPORATION, OF DETROIT, MICHIGAN, A CORPORATION OF MICHIGAN.

INTERNAL-COMBUSTION ENGINE FOR AIRCRAFT.

Application filed November 14, 1927. Serial No. 233,250.

The invention relates to internal combustion engines designed particularly for use with aircraft. One of the objects of the invention is to construct the engine to provide for maximum power and minimum weight. Another object is to provide an improved connection between the crank shaft and the propeller by means of which the total weight of the engine is reduced. A further object is to provide an improved crank case which is of light but strong construction, thereby reducing the total weight of the engine. With these as well as other objects in view, the invention resides in the novel features of construction and combinations and arrangements of parts as more fully hereinafter set forth.

In the drawings:—

Figure 2:
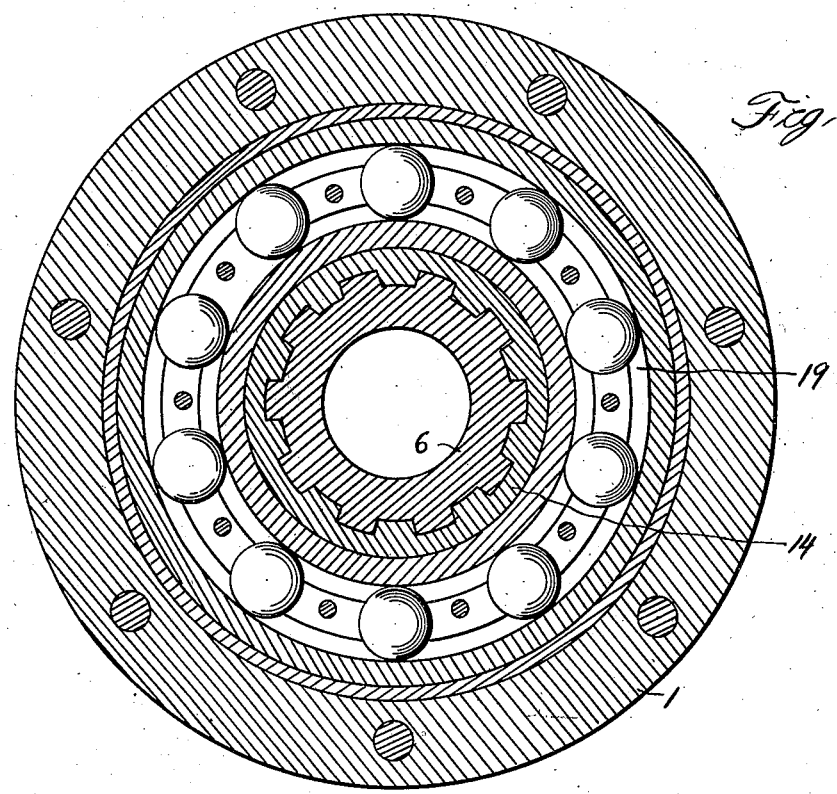
Figure 3:
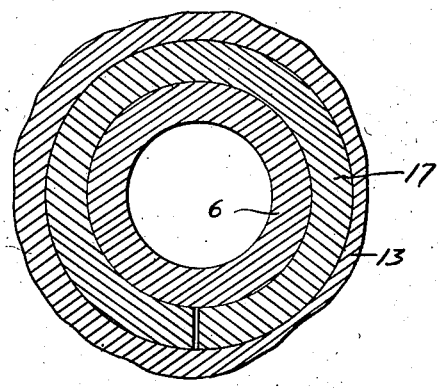

Figure 1 is a sectional view, showing an internal combustion engine embodying my invention;

Figures 2 and 3 are cross sections, respectively, on the lines 2—2 and 3—3 of Figure 1.

The engine is of the radial multi-cylinder type having the crank case 1 and the radially arranged cylinders 2 about the periphery of the crank case. The crank case comprises the cooperating front and rear sections 3 and 4, respectively, which have their adjacent edges in the aproximate plane of the axes of the cylinders and which are suitably secured together as by means of the bolts 5 and nuts 5' which are located between the cylinders. 6 is the crank shaft of the engine journaled in the front and rear sections of the crank case by the anti-friction bearings 7 and 8, respectively. For the purpose of providing a light construction of crank case, which at the same time is amply strong to take care of the stresses to which it is subjected during the operation of the engine, the front section 3 of the crank case has the integral front wall 9 and hub 10 with the hub of a size to receive the bearing 7 and the front wall providing an extended ring from the hub to the periphery of the crank case to which the cylinders are connected. Furthermore, there are the radially extending ribs 11 integral with the front wall 9, the hub 10 and the peripheral wall of the front section to reinforce the same to thereby better take care of the stresses incident to the operation of the engine.

To connect the propeller 12 to the crank shaft 6 and at the same time to provide for reducing the total weight of the engine, there is the sleeve 13 which has the sleeve portion 14 extending within the hub 10 and non-rotatably secured to the crank shaft 6 as by being splined thereto. This sleeve also has the transverse annular flange 15 outside the crank case and at the rear side of the hub portion of the propeller to which the latter is secured as by means of the bolts 16 and nuts 16'. For retaining the sleeve from longitudinal outward movement relative to the crank shaft, there is the longitudinally split cone 17 encircling the crank shaft and having a wedging engagement with the sleeve and the nut 18 threaded upon the front end of the crank shaft and abutting the cone. Suitable means extending through the nut and crank shaft may be provided for locking the two together. For supporting the sleeve I have provided the anti-friction bearing 19 within the front end of the hub 10 and opposite the bearing 7, there being a suitable spacer 20 encircling the sleeve portion 14 and positioned between these bearings.

With the arrangement as above described, it will be seen that by making the front section of the crank case in one piece and that by forming a small integral hub upon this front section of a size to receive the bearing for the crank shaft the necessary weight of this front section may be kept at the minimum owing to the fact that an extended ring of metal is provided for absorbing the stresses incident to the operation of the engine. It will also be seen that my connection between the propeller and crank shaft permits of greatly reducing the total weight of an engine in which the crank shaft extends through the propeller and furthermore provides for mounting the propeller upon the crank case.

What I claim as my invention is:

1. In an aircraft engine, the combination with a crank case, a crank shaft, a bearing for said crank shaft carried by said crank case and a propeller, of a sleeve connected to said crank shaft and propeller for driving the latter from the former, and a bearing for said sleeve, said last mentioned bearing being carried by said crank case and being located at one side of said first mentioned bearing.

2. In an aircraft engine, the combination with a crank case, a crank shaft and a propeller, of a sleeve splined upon said crank shaft and having a portion outside said crank case directly secured to said propeller for driving the latter from the former, means for retaining said sleeve from longitudinal movement relative to said crank shaft, and a bearing for said sleeve carried by said crank case.

3. In an aircraft engine, the combination with a crank case, a crank shaft and a propeller, of a sleeve splined upon said crank shaft and having a transverse flange for connection to said propeller, means threaded upon said crank shaft for retaining said sleeve from longitudinal movement relative to said crank shaft, and a bearing for said sleeve carried by said crank case.

4. In an aircraft engine, the combination with a crank case, a crank shaft and a propeller, of a sleeve splined upon said crank shaft within said crank case and having a transverse flange outside said crank case for connection to said propeller, a longitudinally split cone encircling said crank shaft and engaging said sleeve for retaining the same from longitudinal movement relative to said crank shaft, a nut threaded upon said crank shaft and abutting said cone, and a bearing encircling the splined portion of said sleeve and carried by said crank case.

5. In an aircraft engine, the combination with a crank case having a hub at one end, a crank shaft extending through said hub and a propeller, of a sleeve having a portion extending within said hub and non-rotatably secured to said crank shaft and a portion outside said crank case and connected to said propeller, a bearing within said hub for said crank shaft, and an adjacent bearing within said hub for said sleeve.

6. In an aircraft engine, the combination with a crank case having an integral inwardly extending hub at one end, a crank shaft journaled in said hub and a propeller, of a sleeve connected directly to said propeller having a portion connected to said crank shaft within said hub.

7. In an aircraft engine, the combination with a crank case, a crankshaft and a propeller, of a sleeve splined upon said crankshaft and having a transverse flange for connection to said propeller, and a bearing for said sleeve carried by said crankcase.

In testimony whereof I affix my signature.

WILLIAM O. WARNER.